United States Patent
Hirdina

(10) Patent No.: US 8,580,166 B2
(45) Date of Patent: Nov. 12, 2013

(54) BLOW MOULDING MACHINE WITH ARRANGEMENT FOR CLEANING THE BLOW MOULD

(75) Inventor: Jochen Hirdina, Regensburg (DE)

(73) Assignee: Krones AG (DE)

( * ) Notice: Subject to any disclaimer, the term of this patent is extended or adjusted under 35 U.S.C. 154(b) by 393 days.

(21) Appl. No.: 12/853,162

(22) Filed: Aug. 9, 2010

(65) Prior Publication Data

US 2011/0037188 A1 Feb. 17, 2011

(30) Foreign Application Priority Data

Aug. 11, 2009 (DE) .......................... 10 2009 036 920

(51) Int. Cl.
*B29C 49/36* (2006.01)
*B29C 49/42* (2006.01)
*B29C 33/72* (2006.01)

(52) U.S. Cl.
USPC ............. 264/39; 425/227; 425/229; 425/529; 425/540

(58) Field of Classification Search
USPC ............. 425/90, 98, 100, 225, 226, 227, 229, 425/529, 540; 264/39
See application file for complete search history.

(56) References Cited

U.S. PATENT DOCUMENTS

| | | | |
|---|---|---|---|
| 2,672,652 A | 3/1954 | Howe et al. | |
| 3,941,537 A * | 3/1976 | Abraham | 425/228 |
| 4,741,688 A * | 5/1988 | Aoki | 425/526 |
| 5,022,839 A * | 6/1991 | Brussel | 425/161 |
| 5,249,947 A * | 10/1993 | Inaba et al. | 425/150 |
| 6,004,190 A * | 12/1999 | Trampusch | 451/89 |
| 2002/0166504 A1 | 11/2002 | Yoo | 118/72 |
| 2003/0094185 A1 | 5/2003 | Osada et al. | |
| 2009/0241601 A1* | 10/2009 | Balbi | 65/26 |
| 2010/0303946 A1 | 12/2010 | Voth | 425/226 |

FOREIGN PATENT DOCUMENTS

| | | | |
|---|---|---|---|
| DE | 4222274 A1 * | 1/1994 | |
| DE | 691 26 877 T2 | 1/1998 | |
| DE | 10064167 A1 * | 7/2002 | |
| DE | 600 07 123 T2 | 9/2004 | |
| DE | 102007017938 A1 * | 10/2008 | |
| EP | 203371 A1 * | 12/1986 | |
| EP | 2 255 949 A1 | 12/2010 | |
| JP | 2004-259931 | 9/2004 | |
| WO | WO 02/051 620 A1 | 7/2002 | |

OTHER PUBLICATIONS

Partial machine translation of DE 102007017938 A1 dated Oct. 2008 obtained from the espace website.*
Partial machine translation of DE 10064167 A1 dated Jul. 2002 obtained from the espace website.*

(Continued)

*Primary Examiner* — Robert B Davis
(74) *Attorney, Agent, or Firm* — Hayes Soloway P.C.

(57) ABSTRACT

An apparatus for transforming plastic preforms into containers, includes at least one blow mould which forms a cavity, inside which the plastic preforms can be transformed into containers. The apparatus includes an opening and closing mechanism for opening and closing the blow mould, and a cleaning device for cleaning regions of the blow mould. The cleaning device includes at least a first cleaning element for cleaning an inner wall of the blow mould, which cleaning element is arranged at least at times outside the blow mould.

14 Claims, 1 Drawing Sheet

(56) References Cited

OTHER PUBLICATIONS

Dominick V. Rosato et al, Blow Molding Handbook, 2003, Hanser Gardner Publications, Inc., 2nd edition, Section 12.2.2.2 entitled Solvent Cleaning pp. 546-547.*

Plastics Technology, Dry-Ice Spray Cleans Molds Fast (Keeping up with Tooling), Feb. 2002, brief article from Husky Injection Molding Systems, Inc.*

European Search Report, dated Sep. 15, 2011 (6 pages).

* cited by examiner

BLOW MOULDING MACHINE WITH ARRANGEMENT FOR CLEANING THE BLOW MOULD

BACKGROUND OF THE INVENTION

The present invention relates to apparatuses for transforming plastic preforms into plastic containers, and in particular to blow moulding machines. Such blow moulding machines have long been known from the prior art. They usually comprise a blow mould, inside which the plastic preforms are expanded through the application of pressure to form plastic containers. During this stretch-blow moulding of plastic containers, so-called oligomers, i.e. short-chain molecules or foreign substances, are excreted onto the blow mould from the plastic of the plastic preforms. The surface of these blow moulds therefore becomes dull and in the extreme case rough as it becomes increasingly soiled. However, this has negative effects on the bottle quality, since this may lead to the situation whereby the bottle appearance may become cloudy on account of the dull blow moulds or else the cooling on the mould surface is reduced as a result of the roughness.

Since both of these problems are unacceptable, the blow moulds must be cleaned and usually polished at regular intervals. Particularly high degrees of soiling by oligomers occur when working with high mould temperatures for process reasons (e.g. in the case of hot fill processes), since soiling is much faster with hot moulds and the cleaning of the moulds in the hot state can be carried out only with a safety risk due to the risk of burning. Particularly in the case of a so-called hot filling installation with a blow moulding machine and a filler block, this cleaning of the moulds is often a very negative aspect.

A container production apparatus and a production method for moulded bodies are known from WO 2008 125216 A2. In this case, a radiation device is arranged at or on the blow moulding machine, the radiation being directed at least onto one region of the blow moulding machine.

The object of the present invention is therefore to simplify the cleaning of such blow moulding machines. The object of the invention is also to provide an automated method for cleaning blow moulds.

SUMMARY OF THE INVENTION

An apparatus according to the invention for transforming plastic preforms into containers comprises at least one blow mould which forms a cavity, inside which the plastic preforms can be transformed into containers. The apparatus also comprises a pressure application device for applying a medium to the plastic preforms in order to expand the latter against an inner wall of the blow mould delimiting the cavity. The apparatus advantageously also comprises a stretching rod for stretching the plastic preforms in the longitudinal direction thereof, and also an opening and closing mechanism for opening and closing the blow mould. The apparatus also comprises a cleaning device for cleaning regions of the blow mould.

According to the invention, the cleaning device comprises at least a first cleaning element for cleaning the inner wall of the blow mould, and this cleaning element is arranged at least at times outside the blow mould. Advantageously, the cleaning device allows an automated cleaning of the blow mould. For example, a special cleaning mode may be provided, in which the blow mould or the inner wall thereof is cleaned. However, the present invention is also applicable to blow moulding machines which have no stretching rod.

It is therefore proposed according to the invention to use a cleaning system and in particular a so-called CIP (Cleaning-In-Place) cleaning system to clean the inner wall of the blow mould. Particularly during the times in which the cleaning element is not carrying out any cleaning, said cleaning element is arranged outside the blow mould. The opening and closing mechanism is advantageously also used to load a blow mould with new plastic preforms and to remove blow-moulded containers from the blow mould.

In one advantageous embodiment, the apparatus comprises a transport device which transports the blow moulds along a predefined transport path. Advantageously, a plurality of blow moulds are arranged on a rotatable carrier and particularly preferably on a circular carrier. This is preferably the same carrier on which the blow moulds can also be arranged during normal operation of the apparatus. The apparatus advantageously has a cleaning mode for carrying out the cleaning of the blow moulds.

The blow moulds are advantageously arranged such as to be movable relative to the cleaning device. To this end, it is possible that the cleaning devices or cleaning elements are arranged in a stationary manner along the transport path of the blow moulds in the normal operating mode. However, it would also be possible that the cleaning device together with the blow moulds is arranged on a carrier and this carrier transports both the blow moulds and the cleaning elements.

In a further advantageous embodiment, at least one cleaning element is a cleaning nozzle which applies a liquid cleaning medium to the inner wall.

Suitable cleaning agents are those substances which can be used to clean (CIP cleaning) the outside and inside of machines and installations in the beverage-bottling industry. Examples of such cleaning agents are sodium hydroxide (NaOH), acidic cleaning agents based on phosphoric acid, acidic cleaning agents based on nitric acid, disinfecting agents based on acetic acid, ozone, hydrogen peroxide, chloralkali cleaning agents, hot water or steam. In addition, chlorine dioxide could also be used as the cleaning agent.

In a further advantageous embodiment, the cleaning device comprises a second, mechanical cleaning element which can be brought into contact with the inner wall. This cleaning element may be for example a brush device which is advantageously arranged such as to be able to rotate. This second cleaning element is preferably also arranged outside the blow mould in a closed state of the latter. Advantageously, the first cleaning element can be controlled independently of the second cleaning element. The first cleaning element and the second cleaning element preferably act in different ways on the inner wall of the blow mould.

In a further advantageous embodiment, the mechanical cleaning element is arranged after the cleaning nozzle in the transport direction of the blow moulds. It is thus possible that the inner wall is first sprayed with the cleaning medium and then cleaned and/or polished by the cleaning brush.

In a further advantageous embodiment, the cleaning element, for example the brush, is spaced apart from the cleaning nozzle in the transport direction of the blow moulds. In this way, in the cleaning mode, a predefined period of time elapses between the application of the cleaning medium to the inner wall and the subsequent polishing with the brush, so that the cleaning medium is left to act for a certain period of time. However, it would also be possible that, for example while the blow mould is stationary, firstly a cleaning nozzle and then a cleaning brush enters the blow mould.

Preferably, transport devices are provided for moving the cleaning nozzles or cleaning brushes. These may be transport devices which move the nozzles or the brushes for example perpendicular to the longitudinal direction of the blow mould. However, it would also be possible that said elements are introduced into the blow mould in the longitudinal direction of the blow mould.

In a further advantageous embodiment, the apparatus comprises a rotatable carrier, on which a plurality of blow moulds are arranged.

Advantageously, the apparatus also comprises a rinsing device for rinsing the blow moulds. This rinsing device is in this case preferably provided between a cleaning nozzle and a second cleaning element in the form of a polishing means such as a brush. However, it would also be possible that the rinsing device is provided in the region of the brush, or even after the latter.

The present invention also relates to a method for transforming plastic preforms into plastic containers, wherein the plastic preforms are expanded inside a cavity through the application of a medium to form plastic preforms, and wherein this cavity is formed by at least one inner wall of the blow mould, and the blow mould can be transferred from an open state to a closed state. Furthermore, a cleaning mode is provided, in which no plastic container is accommodated inside the blow mould and at least one region of the blow mould is cleaned.

According to the invention, the cleaning takes place at least partially and preferably entirely in an open state of the blow mould and a first cleaning element for cleaning the inner wall of the blow mould is arranged at least at times outside the blow mould. This element is provided outside the blow mould in particular in a conventional operating mode, i.e. in a mode other than the cleaning mode. Preferably, this cleaning element is provided outside the blow mould in a closed state of the latter.

However, such a cleaning element is not provided exclusively for use in blow moulding machines. Cleaning by means of a CIP apparatus ("CIP cleaning") is possible in particular in apparatuses for treating plastic preforms and/or plastic containers. The CIP cleaning of the preferential heating module via an insertable rod or an automaton from outside would be conceivable. In this connection, a preferential heating module is understood to mean a device suitable for controlling the temperature of at least one plastic preform in such a way that it has a temperature profile in one direction of expansion. If, for example, the temperature profile extends around the circumference, it is possible during a subsequent expansion of the plastic preform to expand hotter regions to a greater extent than cooler regions. It is thus possible in a simple manner to produce for example plastic containers which have an oval cross section at least in some parts.

The cleaning of other treatment units by means of a CIP apparatus is also possible, such as sterilisation apparatuses for example. By way of example, the CIP cleaning of an $H_2O_2$ module (hydrogen peroxide sterilisation module) via an insertable rod or an automaton from outside is conceivable.

In one advantageous method, the blow mould is opened and a liquid cleaning agent is applied to the inner wall in the open state.

In a further advantageous method, the inner wall is cleaned by a mechanical cleaning element in an open state of the blow mould. This cleaning by the mechanical cleaning element takes place in particular after the application of the fluid.

The blow mould is advantageously transported, namely both during the operating mode and in particular also during the cleaning mode.

In a further advantageous method, the cleaning fluid is left on the inner wall of the blow mould for a predefined period of time in order to act thereon.

Advantageously, a rinsing mode is also provided, in which the inner wall is rinsed. This rinsing mode is advantageously provided after the application of the cleaning agent and before or after the polishing or cleaning of the inner wall with the brush or the cleaning element. In a further preferred method, the brush or the cleaning element is laterally inserted during this, i.e. in a direction perpendicular to the longitudinal direction of the blow mould.

BRIEF DESCRIPTION OF THE DRAWINGS

Further advantages and embodiments will emerge from the appended figures.

In the figures.

DETAILED DESCRIPTION OF THE INVENTION

Figure 1:
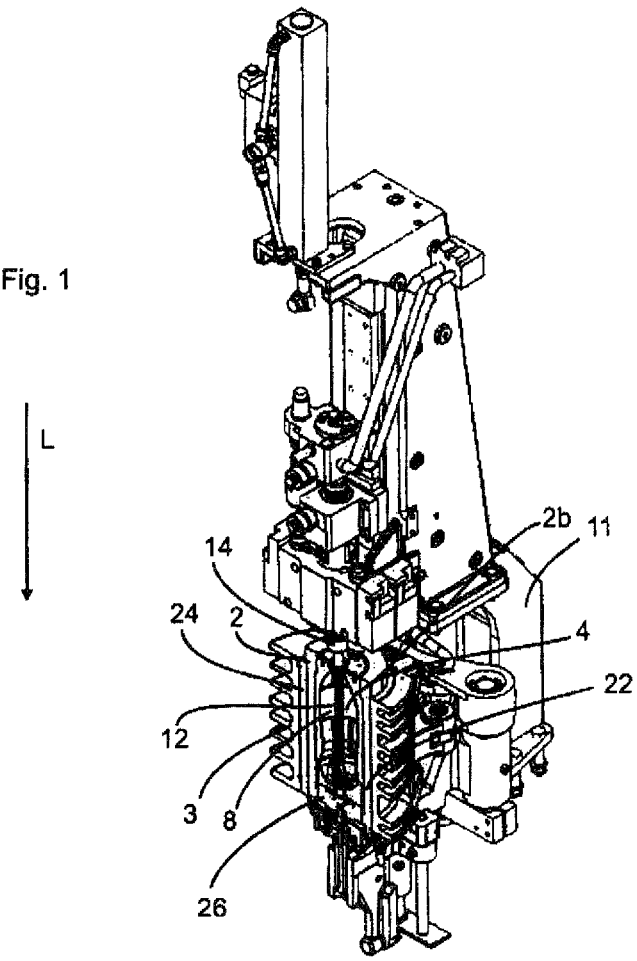
FIG. 1 shows a perspective view of an apparatus for the transformation.

FIG. 1 shows an apparatus for transforming plastic preforms (not shown) into plastic containers (not shown). This apparatus comprises a main carrier 11, on which a blow mould 2 is arranged in a blow mould carrier 3 (in each case shown only partially).

Formed inside the blow mould 2 is a cavity 4, inside which the plastic preforms are expanded through the application of compressed air to form plastic containers. Furthermore, the apparatus comprises a stretching rod 12, which is movable here in the longitudinal direction L in order to stretch the plastic preforms. Reference 22 denotes a first blow mould half and reference 24 denotes a second blow mould half. In addition, the blow mould also has a bottom or a bottom part which closes the cavity 4 in the downward direction during operation. Reference 14 denotes a pressure application device or blowing nozzle which applies compressed air to the plastic preforms.

Figure 2:
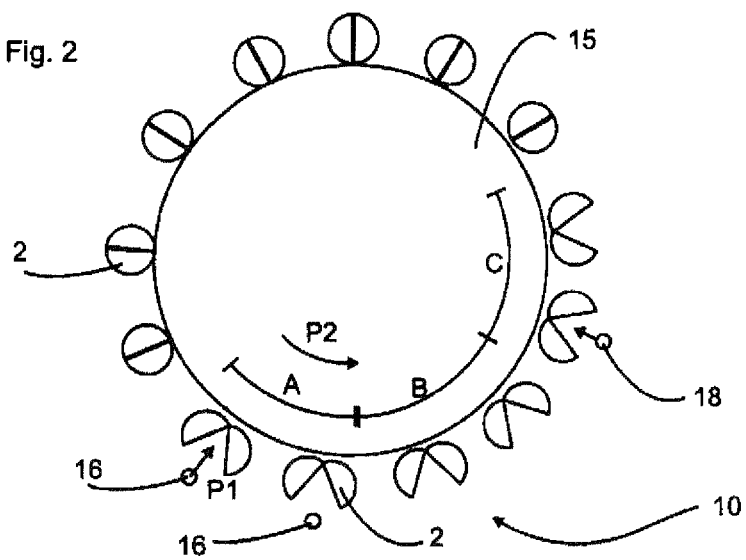
FIG. 2 shows a schematic view of an installation according to the invention.

FIG. 2 shows a schematic view to illustrate a cleaning procedure. This shows in detail a machine in a preferably special cleaning mode. More specifically, this is an automatic cleaning process which nevertheless can be incorporated on machines that are already in development and on mould changing machines that have already been developed by the applicant. This mould changing device already has the ability to open the mould carrier automatically and also to loosen appropriate fixing screws and tighten these again. This arrangement also already allows an automatic closing of the mould carrier.

For use as a cleaning device, in particular the fixing functions are replaced by the cleaning function. In this case, the mould is unlocked and opened in a first stage or the region denoted by reference A. A spray head 16 applies a cleaning agent to the inner wall of the open blow mould 2. For this purpose, this spray head 10 may be moved (arrow P1) by means of a transport or displacement device into the inner region of the blow mould 2, which is now open, or else can be guided over the inner surface 8 of the blow mould by means of a special device, such as a robotic arm for example, and can spray said surface.

It would also be possible that a plurality of such spray heads are provided. For example, use could be made of spray heads which are set in rotation by the cleaning medium passing through, and which thus dispense the cleaning agent in the full circumferential direction. A plurality of such spray heads could also be arranged one above the other in the longitudinal direction L of the blow moulds 2 shown in FIG. 1.

In the region denoted by reference B, the cleaning agent acts on the inner surface 8 of the blow mould 2 (cf. FIG. 1). It would also be possible to close the blow mould again in this region, but in the embodiment shown in FIG. 2 the blow mould 2 remains open in this state. In the section denoted by reference C, a second cleaning element 18 is used which mechanically cleans the sprayed inner surface. This may be for example a rotating polishing head which cleans the inner surface. At the same time as this polishing process, the rinsing liquid, such as distilled water for example, may also be applied to the inner surface. However, this application of distilled water could also take place at the end of the region B, or after the polishing process.

The cleaning element 18 is also moved into the inner region of the open blow mould 2 for cleaning purposes. However, it would also be possible that a corresponding cleaning element is moved into the blow mould from above or from below. Depending on the geometric dimensions, two polishing elements in the form of two parallel brushes would also be conceivable, which mechanically clean the inner wall 8.

After the region C, the blow mould is closed again. Reference 15 denotes the rotating carrier (arrow P2) on which the blow moulds 2 are arranged, and reference 10 denotes the cleaning device in its entirety. In addition, the apparatus may have cams (not shown) which bring about the opening and closing of the blow moulds 2. Cams which move the cleaning elements 16 and 18 into the open blow mould and out of the latter may additionally also be provided. However, these movements may also be brought about by electric motors and in particular by servo motors.

By virtue of the mould cleaning according to the invention, there is no need for manual cleaning which is very complicated in the prior art. For example, the moulds must at present be placed into a cleaning fluid during storage in a mould changing carriage. Furthermore, there is the advantage that this automatic mould cleaning can be carried out even while the blow moulds are still very hot in parts, which is not possible in the case of manual cleaning due to the risk of injury to the user. However, these increased temperatures, particularly of the inner surfaces 8, offer the advantage of a possible greater efficiency of the cleaning agent and of the cleaning process per se. Preferably, the apparatus according to the invention has a special cleaning mode, which may be provided for example as an interval circuit. Furthermore, removal or opening of the blow moulds by the user is no longer necessary, and the safety risk is reduced since the protection circuit of the machine remains closed even during the cleaning.

Furthermore, as mentioned above, an increased temperature of the blow mould can be maintained even during the cleaning, or the blow mould may also be temperature-controlled or cooled during the cleaning. This ensures a quicker restart after the cleaning process.

It is pointed out that the cleaning arrangement according to the invention can also be retrofitted on already existing installations. As shown in FIG. 2, both the cleaning element 16 or the spray head 16 and the cleaning element 18 are arranged in a stationary manner relative to the direction of rotation of the carrier 15. However, it would also be possible to arrange these elements 16, 18 in a movable manner, for example on the carrier 15. In a cleaning mode, the individual blow moulds 2 can be moved (preferably in cycles), so that for example a specific blow mould remains in a correct position and then the cleaning processes are carried out.

All of the features disclosed in the application documents are claimed as essential to the invention in so far as they are novel individually or in combination with respect to the prior art.

LIST OF REFERENCES

1 apparatus
2 blow mould
3 blow mould carrier
4 cavity
8 inner surface
10 cleaning device
11 main carrier
12 stretching rod
14 pressure application device
15 carrier
16 first cleaning element, spray head
18 cleaning element
22 first blow mould half
24 second blow mould half
26 bottom part
A, B, C region
L longitudinal direction
P1, P2 arrows

The invention claimed is:

1. An apparatus for transforming plastic preforms into containers, comprising at least one blow mould which forms a cavity, inside which the plastic preforms can be transformed into containers, said apparatus comprising a pressure application device for applying a medium to the plastic preforms in order to expand the latter against an inner wall of the blow mould delimiting the cavity, a stretching rod for stretching the plastic preforms in a longitudinal direction (L) thereof, and an opening and closing mechanism for opening and closing the blow mould, wherein the apparatus includes a transport device which transports the blow moulds along a predefined path, and a cleaning device for cleaning regions of the blow mould, wherein the cleaning device comprises at least a first cleaning element for cleaning the inner wall of the blow mould which cleaning element is arranged at least at times outside the blow mould, wherein the at least first cleaning element is a cleaning nozzle, and the cleaning device also comprises a mechanical cleaning element which can be brought into contact with the inner wall of the blow mould, and wherein the mechanical cleaning element is arranged after the cleaning nozzle in the transport direction of the blow moulds.

2. Apparatus according to claim 1, wherein the blow mould is arranged such as to be movable relative to the cleaning device.

3. Apparatus according to claim 1, wherein at least one cleaning element is a cleaning nozzle which applies a liquid cleaning medium to the inner wall.

4. The apparatus according to claim 1, wherein the mechanical cleaning element is spaced apart from the cleaning nozzle in the transport direction of the blow moulds.

5. The apparatus according to claim 1, wherein the apparatus comprises a rotatable carrier, on which a plurality of blow moulds are arranged.

6. The apparatus according to claim 1, wherein the apparatus comprises a rinsing device for rinsing the blow moulds.

7. A method for transforming plastic preforms into plastic containers, using the apparatus of claim 1, wherein the plastic preforms are expanded inside a cavity through the application of a medium to form plastic preforms, wherein a movable stretching rod stretches the plastic preforms, and wherein the cavity is formed by at least one inner wall of a blow mould, and the blow mould can be transferred from an open state to a closed state, wherein a cleaning mode is provided, in which no plastic container is accommodated inside the blow mould and at least one region of the blow mould is cleaned, wherein the cleaning takes place in an open state of the blow mould and a first cleaning element for cleaning the inner wall of the blow mould is arranged at least at times outside the blow mould, and wherein the blow mould is opened and a liquid cleaning agent is applied to the inner wall in the open state.

8. The method according to claim 7, wherein the inner wall is cleaned by a mechanical cleaning element in an open state of the blow mould.

9. The method according to claim 7, wherein the cleaning fluid is left on the inner wall for a predefined period of time in order to act thereon.

10. The method according to claim 7, wherein a rinsing mode is provided, in which the inner wall is rinsed.

11. A method according to claim 7, wherein the at least one cleaning element comprises a liquid cleaning nozzle which applies a liquid cleaning medium to the inner wall, and the cleaning device further comprises a mechanical cleaning element which can be brought into contact with the inner wall of the blow mould, and wherein the mechanical cleaning element is arranged after the cleaning nozzle in a transport direction of the blow moulds.

12. The method according to claim 11, wherein the cleaning nozzle and/or the mechanical cleaning element are moved into the inner region of the open blow mould.

13. The method according to claim 7, wherein the cleaning is carried out while the blow moulds are hot.

14. The method according to claim 7, wherein the cleaning mode is a interval circuit.

* * * * *